United States Patent
Patel et al.

(10) Patent No.: US 9,990,307 B1
(45) Date of Patent: Jun. 5, 2018

(54) SPLIT PACKET TRANSMISSION DMA ENGINE

(71) Applicant: Netronome Systems, Inc., Santa Clara, CA (US)

(72) Inventors: Chirag P. Patel, Nashua, NH (US); Salma Mirza, Woburn, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 793 days.

(21) Appl. No.: 14/527,642

(22) Filed: Oct. 29, 2014

(51) Int. Cl.
- *G06F 12/10* (2016.01)
- *G06F 12/1081* (2016.01)
- *G06F 13/30* (2006.01)
- *H04L 12/40* (2006.01)

(52) U.S. Cl.
CPC .......... *G06F 12/1081* (2013.01); *G06F 13/30* (2013.01); *H04L 12/40071* (2013.01)

(58) Field of Classification Search
CPC . G06F 12/1081; G06F 13/30; H04L 12/40071
See application file for complete search history.

(56) References Cited

U.S. PATENT DOCUMENTS

| 6,172,990 | B1* | 1/2001 | Deb | ......................... | H04L 29/06 370/466 |
| 2004/0010545 | A1* | 1/2004 | Pandya | .................... | H04L 29/06 709/203 |
| 2013/0215792 | A1* | 8/2013 | Stark | ....................... | H04L 49/15 370/257 |
| 2014/0177629 | A1* | 6/2014 | Manula | ................. | H04L 49/201 370/390 |

* cited by examiner

*Primary Examiner* — Henry Tsai
*Assistant Examiner* — John Roche
(74) *Attorney, Agent, or Firm* — Imperium Patent Works; T. Lester Wallace; Amir V. Adibi

(57) ABSTRACT

Packet information is stored in split fashion such that a first part is stored in a first device and a second part is stored in a second device. A split packet transmission DMA engine receives an egress packet descriptor. The descriptor does not indicate where the second part is stored but contains information about the first part. Using this information, the DMA engine causes a part of the first part to be transferred from the first device to the DMA engine. Address information in the first part indicates where the second part is stored. The DMA engine uses the address information to cause the second part to be transferred from the second device to the DMA engine. When both the part of the first part and the second part are stored in the DMA engine, then the entire packet is transferred in ordered fashion to an egress device.

26 Claims, 15 Drawing Sheets

INGRESS MAC ISLAND

ONE SERDES CIRCUIT

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE "SECOND PART" (PAYLOAD PORTION) IS STORED, AND ISLAND NUMBER OF THE MEMORY CONTROL UNIT THAT INTERFACES WITH THE MEMORY WHERE THE PAYLOAD PORTION IS STORED. |
| 32-BITS | PPI (PACKET NUMBER), CTM ISLAND NUMBER WHERE THE "FIRST PART" (INCLUDES THE HEADER PORTION) IS STORED, PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

(The first two rows constitute the FIRST EIGHT BYTES.)

INGRESS PACKET DESCRIPTOR
(AS OUTPUT BY THE INGRESS NBI)

FIG. 6

| WIDTH | DESCRIPTION |
|---|---|
| 32-BITS | PPI (PACKET NUMBER), CTM ISLAND NUMBER OF WHERE THE "FIRST PART" (INCLUDES THE HEADER PORTION) IS STORED, PACKET LENGTH. |
| 32-BITS | SCRIPT OFFSET VALUE (FROM THE BEGINNING OF THE "FIRST PART" TO THE SCRIPT CODE),<br>TWO-BIT CODE INDICATING HOW BIG THE "FIRST PART" IS (256B/512B/1KB/2KB). |
| 16-BITS | LENGTH OF THE PAYLOAD PORTION OF THE PACKET. |
| 32-BITS | SEQUENCE NUMBER OF THE PACKET. |
| 16-BITS | QUEUE NUMBER: QUEUE TO WHICH THE PACKET BELONGS. ("QUEUE INDICATOR") |
| 8-BITS | I/O DESTINATION TO WHICH THE PACKET IS TO BE SENT. |
| 5-BITS | PACKET SEQUENCER IDENTIFICATION |

EGRESS PACKET DESCRIPTOR

FIG. 8

ME ISLAND

MU ISLAND

EGRESS NBI ISLAND

EGRESS MAC ISLAND

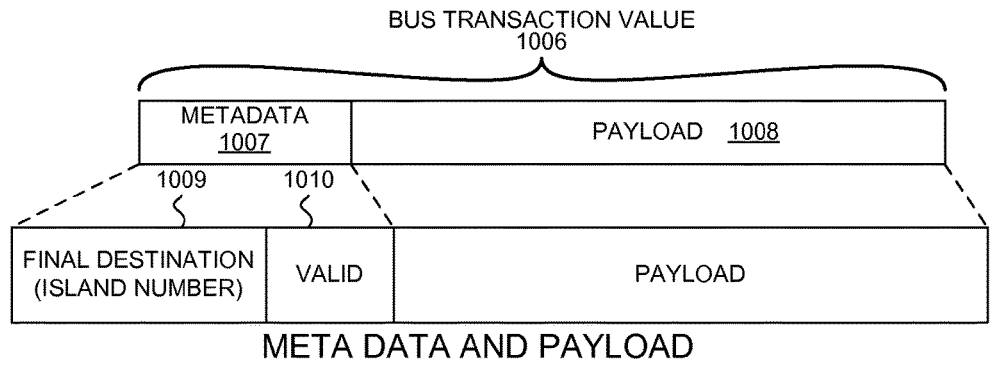

META DATA AND PAYLOAD

FIG. 13

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/ TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 14

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 15

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 16

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 17

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 18

OPERATION OF THE SPLIT PACKET
TRANSMISSION DMA ENGINE

BLOCK DIAGRAM OF THE
SPLIT PACKET TRANSMISSION DMA ENGINE

SPLIT PACKET TRANSMISSION DMA ENGINE

TECHNICAL FIELD

The described embodiments relate generally to the outputting of packets from a network flow processor integrated circuit, and to related methods and structures.

BACKGROUND INFORMATION

A high-speed network flow processor integrated circuit, for speed and throughput and cost reasons, generally does not buffer all packets that pass through the integrated circuit. Rather, the payloads of at least some packets are buffered temporarily in external memory, and when the packet is to be output from the integrated circuit then the packet is assembled on the integrated circuit, and is then output from the integrated circuit. Methods and structures are sought for improving this merging and packet outputting process.

SUMMARY

An amount of packet information (for example, a packet) is stored in split fashion such that a "first part" of the packet information is stored in a first device (for example, in internal memory in a network flow processor integrated circuit) and a "second part" of the packet information is stored in a second device (for example, in external memory external to the network flow processor integrated circuit). The first part may, for example, include an ingress packet descriptor, a packet modifier script code, and a packet header of a packet. The second part may, for example, be packet payload of the packet.

A novel split packet transmission DMA engine receives an egress packet descriptor. The egress packet descriptor is compact and small and does not contain any address identifying where the second part is stored, but the egress packet descriptor does contain information about the first part. In one example, the egress packet descriptor contains a relatively small packet number (Packet Portion Identifier or "PPI") that in turn is usable by a packet engine in the first device to obtain a longer address indicating where the first part is stored in the first device. The PPI is not an address.

In response to receiving the egress packet descriptor, the DMA engine uses the information (in the egress packet descriptor) about the first part to cause a part (for example, the first eight bytes) of the first part to be read from the first device and to be transferred across a bus to the DMA engine. In one example, the bus is a CPP (Command/Push/Pull) bus. There is address information in a predetermined location at the beginning of the first part that indicates where the second part is stored. The DMA engine extracts this address information from the predetermined location, and uses the extracted address information to cause the second part to be read and transferred from the second device across the bus to the DMA engine. The second part is read out of the second device and is transferred across the bus in a plurality of reads and bus transactions. In addition, a part of the first part is read out of the first device and is transferred across the bus in a plurality of memory reads and bus transactions. This part of the first part may be the packet modifier script code and the packet header. As a result, the part of the first part (for example, the script code and the packet header) and the second part (for example, the packet payload) are received onto the DMA engine via the same bus and are stored together in a buffer memory within the DMA engine.

When both the part of the first part and the second part are stored together in the buffer memory in the DMA engine such that the entire amount of packet information is stored in the buffer memory in a single contiguous block of memory locations, then the part of the first part and the second part are transferred, piece by piece, in order, to an egress device. In this way, in one example, the script code, the packet header, and the packet payload are transferred in order into the egress device.

The DMA engine does not include any processor that fetches and executes instructions, but rather the DMA engine is a small amount of dedicated digital logic that serves as a general-purpose bus-accessible data mover resource. In response to being supplied with just a single egress packet descriptor, the DMA engine automatically causes the reading of the appropriate parts of the first and second parts, the merging of the part of the first part and the second part in the buffer memory, and the outputting of the resulting assembled amount of packet information to the egress device.

To set up the merging of the part of the "first part" and the "second part" by the novel split packet transmission DMA engine, an appropriate "first part" is loaded into the first device and an appropriate "second part" is loaded into the second device. The first part is set up to include information at its beginning that indicates where the second part is stored in the second device. This set up may be done by, or under the direction of, another device on the bus (for example, a processor) that communicates with the DMA engine via the bus. To initiate operation of the DMA engine on the first and second parts, the other device causes an appropriate egress packet descriptor to be supplied to the DMA engine.

The DMA engine is similarly usable to merge and output split packets where the second parts of these split packets are stored in an on-chip internal memory (such as for fast-path packets) as opposed to in external memory (such as for exception packets). If the "second part" of a packet is to be stored in an on-chip internal memory, then the first eight bytes of the "first part" are set up such that the address information points to the on-chip internal memory.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a table that sets forth the various components of the ingress packet descriptor as output by the ingress NBI island of FIG. 4.

FIG. 8 is a table that sets forth the various components of an egress packet descriptor.

FIG. 13 is a diagram of a CPP bus transaction value.

FIG. 14 is a table that sets forth the various fields in a command payload of a CPP bus command.

FIG. 15 is a table that sets forth the various fields in a pull-id payload of a CPP bus transaction.

FIG. 16 is a table that sets forth the various fields in a data payload of a CPP bus transaction.

FIG. 17 is a table that sets forth the various fields of a CPP data payload in the case of a pull.

FIG. 18 is a table that sets forth the various fields of a CPP data payload in the case of a push.

FIG. 20 is a flowchart of an operation of the split packet DMA engine 267 of FIG. 10.

DETAILED DESCRIPTION

Reference will now be made in detail to background examples and some embodiments of the invention, examples of which are illustrated in the accompanying drawings.

Figure 1:
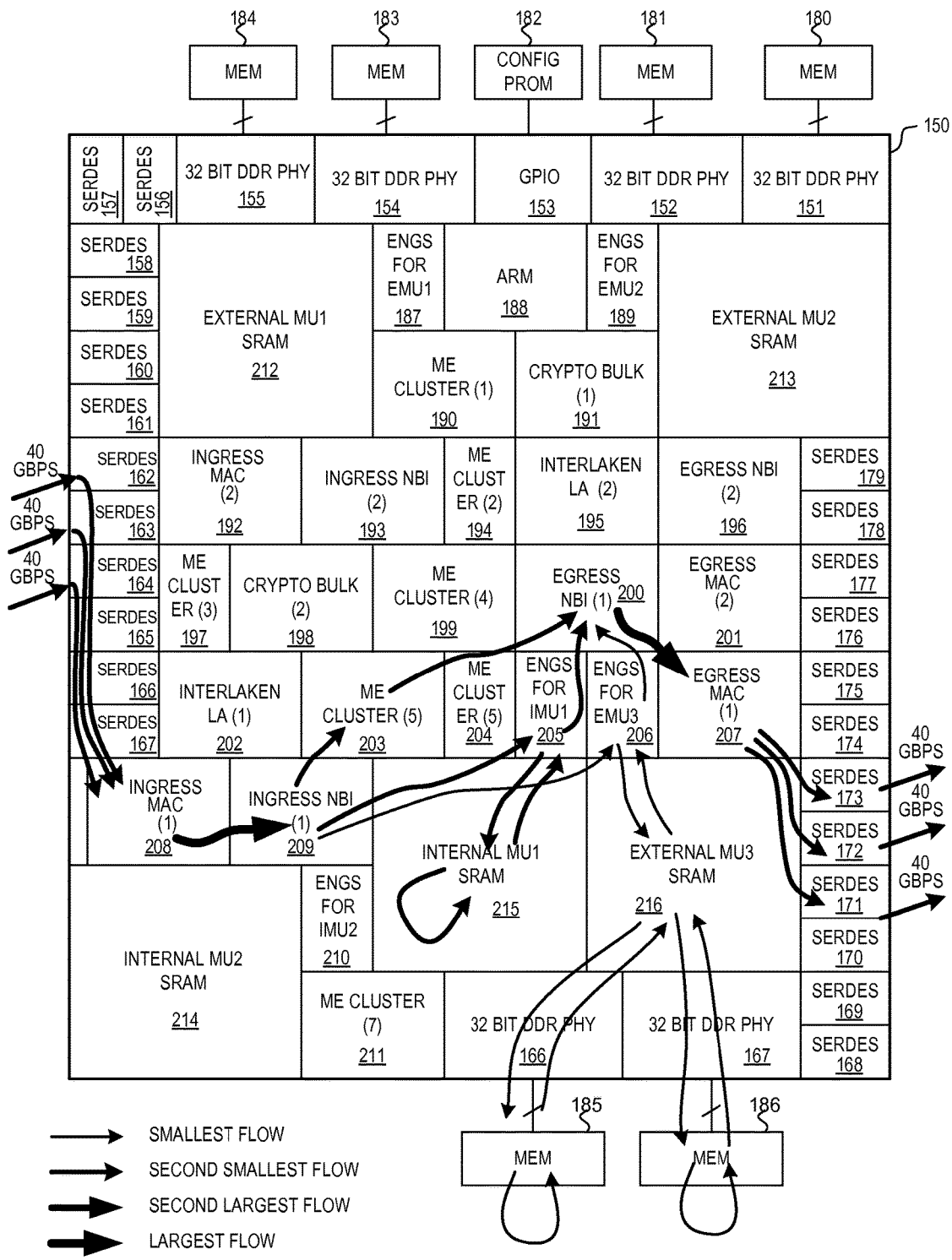
FIG. 1 is a diagram of an Island-Based Network Flow Processor (IB-NFP) integrated circuit that has a split packet transmission DMA engine in accordance with one novel aspect.

FIG. 1 is a diagram that illustrates one example of packet traffic passing through an Island-Based Network Flow Processor (IB-NFP) integrated circuit 150, where the IB-NFP 150 includes a split packet transmission DMA engine in accordance with one novel aspect. The NFP integrated circuit 150 includes a peripheral first area of input/output circuit blocks 151-179. Each of the SerDes I/O circuit blocks 156-167 and 168-179 is duplex in that it has four 10 Gbps lanes for receiving SerDes information and it also has four 10 Gbps lanes for transmitting SerDes information. A SerDes circuit can communicate information in both directions simultaneously. The three SerDes circuits 162-164 can therefore communicate information at 120 gigabits per second in both directions. Respective ones of the DDR physical interfaces 151, 152, 154, 155, 166 and 167 are used to communicate with corresponding external memory integrated circuits 180, 181, 183, 184, 185 and 186, respectively. GPIO interface block 153 is used to receive configuration information from external PROM 182.

In addition to the first peripheral area of I/O blocks, the NFP integrated circuit 150 also includes a second tiling area of islands 187-211. Each of these islands is either a full rectangular shape, or is half the size of the full rectangular shape. For example, the island 192 is a full island. The island 197 is a half island. The functional circuits in the various islands of this second tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern. In the case of the CPP data bus, as described in further detail below, functional circuitry in one island can use the CPP data bus to send a command to functional circuitry in another island, to read data from functional circuitry in another island, or to write data to functional circuitry in another island.

In addition to the second tiling area, there is a third area of larger sized blocks 212-216. The mesh bus structures do not extend into or over any of these larger blocks. The functional circuitry of a larger sized block may connect by direct dedicated connections to an interface island within the tiling area and through this interface island achieve connectivity to the mesh buses and other islands.

In the operational example of FIG. 1, packet traffic is received into three SerDes input/output circuit blocks 162-164. The packet data in this particular example passes through dedicated connections from three SerDes circuit blocks 162-164 to the ingress MAC (Media Access Control) island 208. Ingress MAC island 208 converts successive symbols delivered by the physical coding layer into packets by mapping symbols to octets, by performing packet framing, and then by buffering the resulting packets in an SRAM memory for subsequent communication to other processing circuitry. After buffering in the SRAM, the resulting packets are communicated from ingress MAC island 208 across a single private inter-island minipacket bus, to ingress NBI (Network Bus Interface) island 209. Prepended to the beginning of each packet is a MAC prepend value that contains information about the packet and results of analyses (parse results PR) performed by the ingress MAC island. For each packet, the functional circuitry of ingress NBI island 209 examines fields in the header portion to determine what storage strategy to use to place the packet into memory.

In one example, the ingress NBI island 209 examines the header portion and from that determines whether the packet is an exception packet or whether the packet is a fast-path packet. If the packet is an exception packet, then the ingress NBI island 209 determines a first storage strategy to be used to store the packet so that relatively involved exception processing can be performed efficiently, whereas if the packet is a fast-path packet then the ingress NBI island determines a second storage strategy to be used to store the packet for more efficient transmission of the packet from the NFP integrated circuit 150. The ingress NBI island 209 examines a packet header, performs packet preclassification, determines that the packet is a fast-path packet, and determines that the header portion of the packet should pass to ME (MicroEngine) island 203. The header portion of the packet is therefore communicated across the configurable mesh CPP data bus from ingress NBI island 209 to ME island 203. The ME island 203 determines header modification and queuing strategy for the packet based on the packet flow (derived from packet header and contents) and the ME island 203 informs egress NBI island 200 of these.

In this simplified example being described, the payload portions of fast-path packets are placed into internal SRAM (Static Random Access Memory) MU block 215 and the payload portions of exception packets are placed into external DRAM 185 and 186. I-MU half island 205 is an interface island through which all information passing into, and out of, internal SRAM MU block 215 passes. The functional circuitry within half island 205 serves as the interface and control circuitry for the SRAM within block 215. Accordingly, the payload portion of the incoming fast-path packet is communicated from ingress NBI island 209, across the configurable mesh CPP data bus to I-MU control island 205, and from I-MU control island 205, to the interface circuitry in block 215, and to the internal SRAM circuitry of block 215. The internal SRAM of block 215 stores the payload portions so that they can be accessed for flow determination by the ME island 203.

In addition, a preclassifier in the ingress NBI island 209 determines that the payload portions for others of the packets should be stored in external DRAM 185 and 186. For example, the payload portions for exception packets are stored in external DRAM 185 and 186. E-MU Interface island 206, IP block 216, and DDR PHY I/O blocks 166 and 167 serve as the interface and control for external DRAM integrated circuits 185 and 186. The payload portions of the exception packets are therefore communicated across the configurable mesh CPP data bus from ingress NBI island 209, to E-MU interface and control island 206, to external MU SRAM block 216, to 32-bit DDR PHY I/O blocks 166 and 167, and to the external DRAM integrated circuits 185 and 186.

At this point in the operational example, the packet header portions and their associated payload portions are stored in different places. The payload portions of fast-path packets are stored in internal SRAM in MU block 215, whereas the payload portions of exception packets are stored in external memories 185 and 186.

ME island 203 informs egress NBI island 200 where the packet headers and the packet payloads can be found and provides the egress NBI island 200 with an egress packet descriptor for each packet. Egress NBI island 200 places packet descriptors for packets to be output into the correct order. The egress packet descriptor indicates a queuing strategy to be used on the packet. For each packet that is then scheduled to be transmitted, the novel split packet transmission DMA engine 267 in the egress NBI island 200 uses the egress packet descriptor to read the "first part" of the packet information (including the header portion and any header modification), and to read the "second part" of the packet information (the payload portion), and to assemble the packet to be transmitted in a buffer memory in the split packet transmission DMA engine. A packet modifier of the egress NBI island 200 then performs packet modification on the packet, and the resulting modified packet then passes from egress NBI island 200 and to egress MAC island 207. Egress MAC island 207 buffers the packets, and converts them into symbols. The symbols are then delivered by dedicated conductors from the egress MAC island 207 to three SerDes circuits 171-173 and out of the IB-NFP integrated circuit 150. The SerDes circuits 171-173 together can provide 120 gigabits per second of communication throughput out of the integrated circuit.

Figure 2:
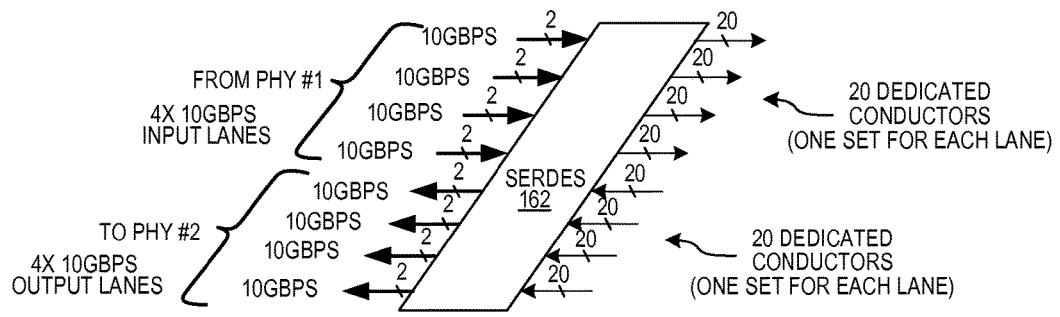
FIG. 2 is a diagram of a SerDes circuit in the IB-NFP integrated circuit of FIG. 1.

FIG. 2 is a more detailed diagram of one of the SerDes I/O blocks 162.

Figure 3:
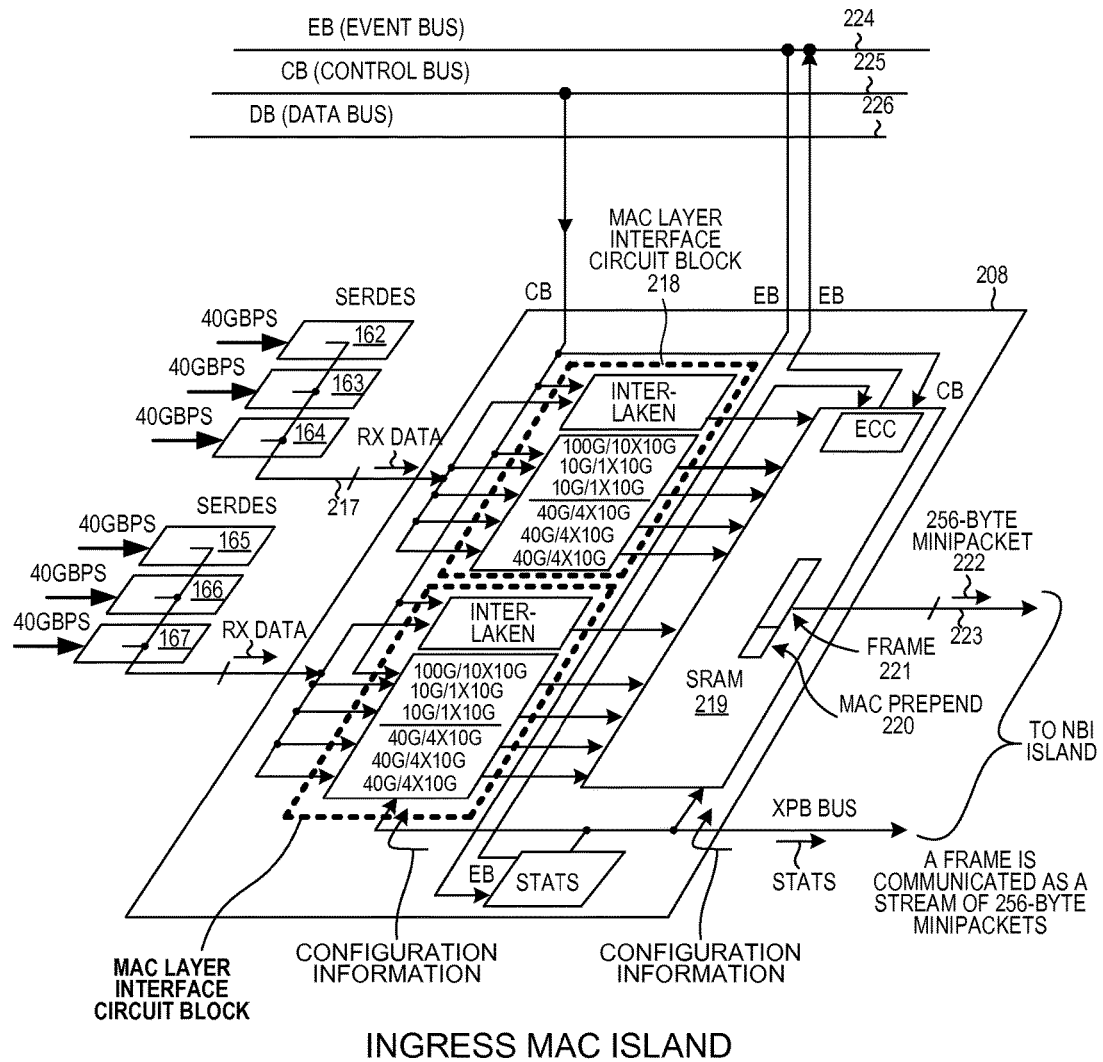
FIG. 3 is a diagram of an ingress MAC island in the IB-NFP integrated circuit of FIG. 1.

FIG. 3 is a more detailed diagram of the ingress MAC island 208. The symbols pass from the three SerDes I/O blocks 162-164 and to the ingress MAC island 208 across dedicated conductors 217. The symbols are converted into packets by a 100 Gbps ethernet block 218. The packets are parsed and analyzed, and a "MAC prepend value" 220 that contains information about the packet is placed at the beginning of the packet 221. The resulting packets and associated MAC prepend values are then buffered in SRAM 219. The MAC prepend value 220 includes: 1) an indication of the length of the packet, 2) an indication whether the packet is an IP packet, 3) and indication of whether the checksums are correct, and 4) a time stamp indicating when the packet was received. Packets that are buffered in SRAM 219 are then output from the ingress MAC island 208 to the ingress NBI island 209 in the form of one or more 256-byte minipackets 222 that are communicated across dedicated connections 223 of a minipacket bus to the ingress NBI island 209. The event bus mesh, the control bus mesh, and the CPP data bus mesh mentioned above are represented in FIG. 3 by reference numerals 224-226, respectively. For additional detailed information on the structure and operation of the ingress MAC island 208, see: U.S. patent application Ser. No. 14/321,732, entitled "Merging PCP Flows As They Are Assigned To A single Virtual Channel", filed on Jul. 1, 2014, now U.S. Pat. No. 9,264,256, by Joseph M. Lamb (all the subject matter of which is hereby incorporated by reference).

Figures 4, 5:
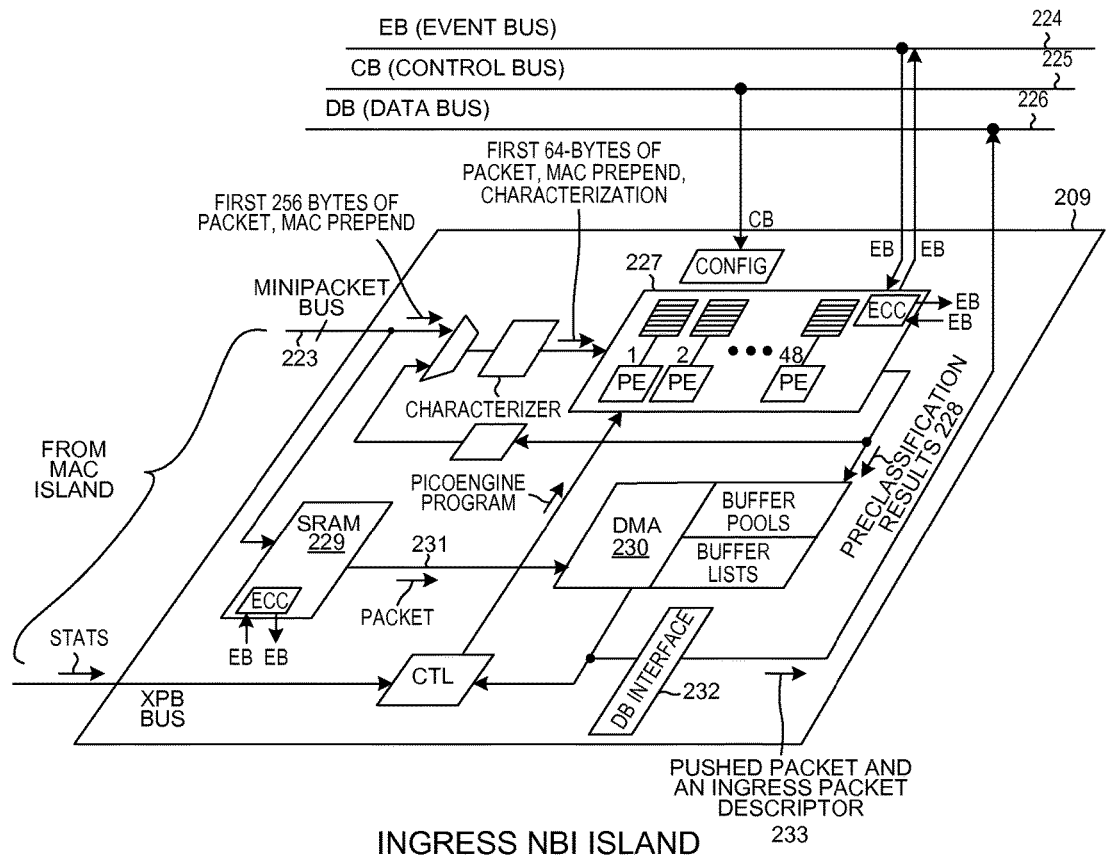
FIG. 4 is a diagram of an ingress NBI island in the IB-NFP integrated circuit of FIG. 1.
FIG. 5 is a table that sets forth the various components of the preclassification results generated by the picoengine pool in the ingress NBI island of FIG. 4.

FIG. 4 is a more detailed diagram of the ingress NBI island 209. Ingress NBI island 209 receives the MAC prepend and the minipacket information via dedicated minipacket bus connections 223 from the ingress MAC island 208. The first 256 bytes of the frame and the MAC prepend pass through multiplexing circuitry and are analyzed by a pool 227 of forty-eight picoengines. Pool 227 generates preclassification results 228. FIG. 5 is a diagram that describes various parts of the preclassification results 228. The preclassification results 228 include: 1) a determination of which one of multiple buffer pools to use to store the frame, 2) a sequence number for the frame in a particular flow of frames through the NFP integrated circuit, and 3) user metadata. The user metadata is typically a code generated by the picoengine pool 227, where the code communicates certain information about the packet. In one example, the user metadata includes a bit that indicates whether the frame was determined by the picoengine pool 227 to be an exception frame or packet, or whether the frame was determined to be a fast-path frame or packet. The actual frame (also referred to here as the packet) is buffered in SRAM 229. A buffer pool is a set of targets in ME islands where header portions can be placed. A buffer list is a list of memory addresses where payload portions can be placed. DMA engine 230 can read the frame out of SRAM 229 via conductors 231, then use the buffer pools to determine a destination to which the frame header is to be DMA transferred, and use the buffer lists to determine a destination to which the frame payload is to be DMA transferred. The DMA transfers occur across the configurable mesh CPP data bus.

In the case of an exception packet, the preclassification user metadata and buffer pool number indicate to the DMA engine 230 that the frame is an exception frame and this causes a first buffer pool and a first different buffer list to be used, whereas in the case of a fast-path frame the preclassification user metadata and buffer pool number indicate to the DMA engine that the frame is a fast-path frame and this causes a second buffer pool and a second buffer list to be used. CPP bus interface 232 is a CPP bus interface through which the configurable mesh CPP data bus 226 is accessed. Arrow 233 represents frames (packets) and their associated ingress packet descriptors that are DMA transferred out of the ingress NBI island 209 by DMA engine 230 and through CCP bus interface 232.

FIG. 6 sets forth the parts of an ingress packet descriptor as the ingress packet descriptor is output by the ingress NBI. This ingress packet descriptor includes: 1) an address indicating where the payload portion is stored in memory (for example, in external memory), 2) an island number of the memory control unit that interfaces with the memory where the payload portion is stored (for example, the E-MU control island 206 that interfaces with external memories 185 and 186), 3) a PPI for the header portion as stored in a CTM, 4) the island number of the CTM where the leader portion is stored, 5) a number indicating how long the entire frame (packet) is, 6) a sequence number for the flow to which the frame (packet) belongs, and 7) user metadata.

After the picoengine pool 227 in the ingress NBI island 209 has done its analysis and generated its preclassification results for a packet, the ingress NBI island 209 then DMA transfers the frame header (packet header) and associated ingress packet descriptor (including the preclassification results) across the CPP configurable mesh data bus 226 and into a CTM 234 (Cluster Target Memory) in the ME island 203. Within the ME island 203, one or more microengines (MEs) then perform further processing on the header and preclassification results as explained in further detail in U.S. patent application Ser. No. 13/399,888, entitled "Island-Based Network Flow Processor Integrated Circuit", filed Feb. 17, 2012, now U.S. Pat. No. 9,237,095, by Stark et al. (all the subject matter of which is hereby incorporated by reference).

Figure 7:
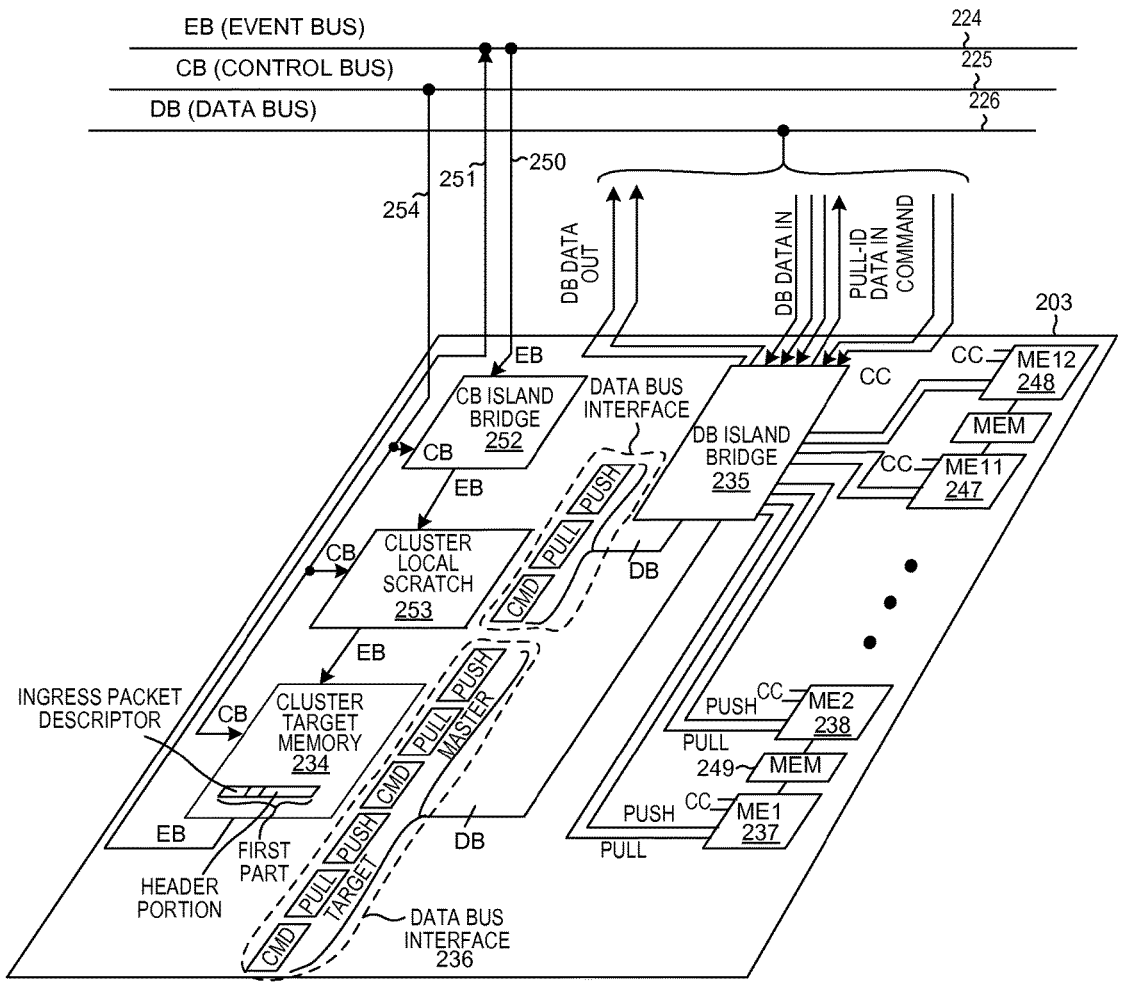
FIG. 7 is a diagram of an ME island in the IB-NFP integrated circuit of FIG. 1.

FIG. 7 is a more detailed diagram of ME island 203. In the operational flow of FIG. 1, packet headers and their ingress packet descriptors are DMA transferred from the ingress NBI island 209 across the configurable mesh CCP data bus and into the CTM 234 of ME island 203. The DMA engine 230 in the ingress NBI island 209 is the master and CTM 234 in ME island 203 is the target for this transfer. The packet header portions and the associated ingress packet descriptors pass into the ME island 203 via CPP data bus island bridge 235 and data bus interface circuitry 236 and are stored in CTM 234. The header portion and its associated information (ingress packet descriptor) stored in the CTM 234 are referred to together here as the "first part" of the packet information of the packet, whereas the payload portion (that is stored in external memory if he packet is not a fast-path packet) is referred to here as the "second part" of the packet information of the packet. Once in the CTM 234, the header portions are analyzed by one or more of twelve microengines (MEs) 237-248. The MEs have, through the DB island bridge 235, a command out interface, a pull-id in interface, a pull-data out interface, and a push data in interface. There are six pairs of MEs, with each pair sharing a memory containing program code for the MEs. Reference numerals 237 and 238 identify the first pair of MEs and reference numeral 249 identifies the shared memory. As a result of analysis and processing, the MEs modify each ingress packet descriptor to be an egress packet descriptor. The processing ME adds a packet modification script code to each "first part", so that the script code is stored between the ingress packet descriptor and the header portion. The processing ME also adds a script code offset value into the egress packet descriptor, where the offset value indicates an offset from the beginning of the "first part" to where the packet modifier script code starts.

FIG. 8 is a diagram that describes the parts of an egress packet descriptor. Each egress packet descriptor includes: 1) a packet portion identifier (PPI) that identifies the packet, 2) an island number that identifies the CTM where the header portion (as part of the "first part" of the packet information) is found, 3) a number indicating how long the entire packet is, 4) a script code offset value (indicating the offset between the beginning of the "first part" and the beginning of the packet modifier script code), 5) a two-bit code indicating how big the "first part" is (either 256 B, or 512 B, or 1 KB or 2 KB), 6) a number indicating the length of the payload portion of the packet, 7) a sequence number of the packet in the flow, 8) an indication of which queue the packet belongs to (result of the packet policy), 9) an indication of where the packet is to be sent (a result of the packet policy), 10) user metadata indicating what kind of packet it is. In this example, the egress packet descriptor does not include any memory address where the "first part" is stored, rather the egress packet descriptor includes the PPI and CTM island number. In this example, the egress packet descriptor also does not include any address in external memory where the "second part" is stored.

In the ME island of FIG. 7, memory errors and other events detected in the ME island are reported via a local event ring and the global event chain back to the ARM island 188. A local event ring is made to snake through the ME island 203 for this purpose. Event packets from the local event chain are received via connections 250 and event packets are supplied out to the local event chain via connections 251. The CB island bridge 252, the cluster local scratch 253, and CTM 234 can be configured and are therefore coupled to the control bus CB via connections 254 so that they can receive configuration information from the control bus CB 225. The event bus and the control bus are shown in simplified form in these diagrams.

Figure 9:
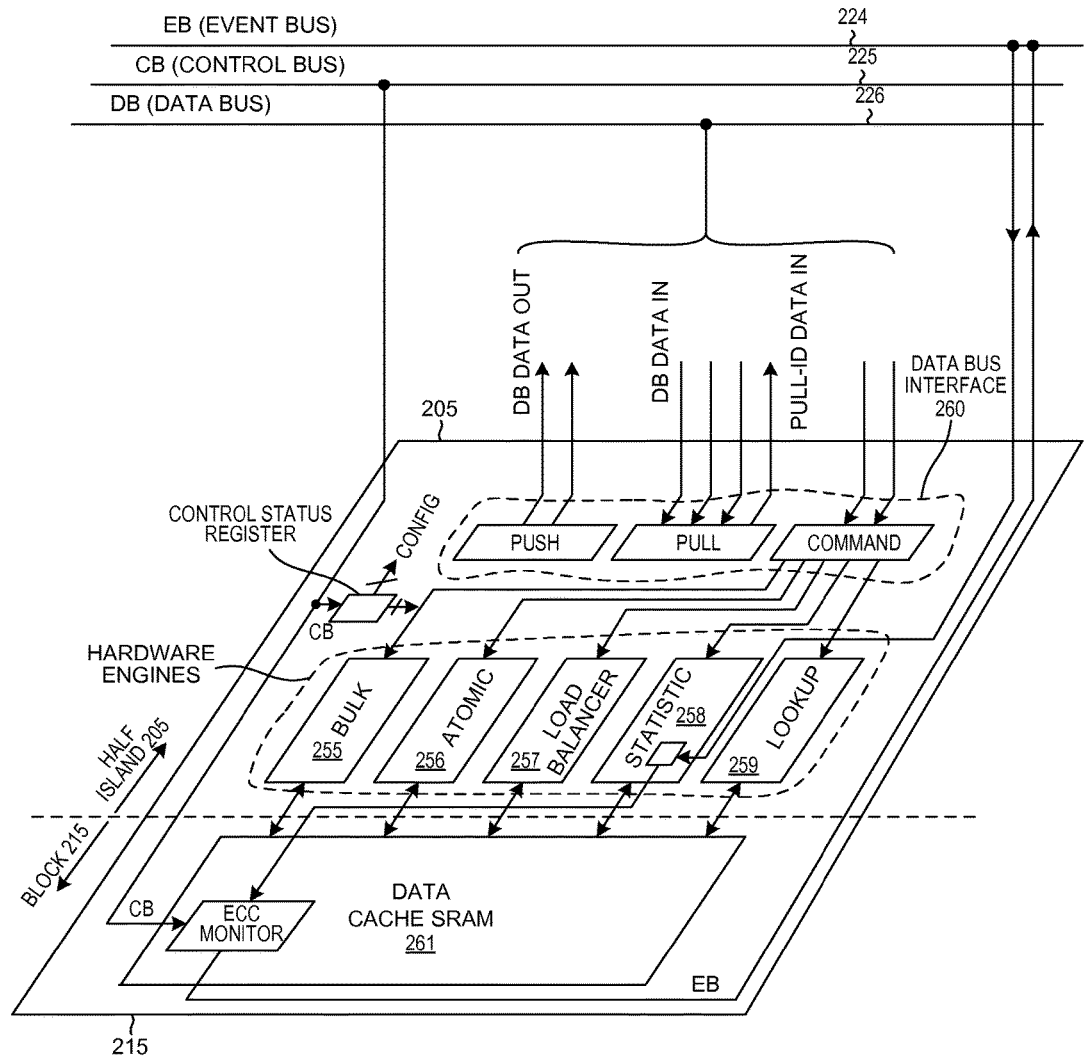
FIG. 9 is a diagram of an MU island in the IB-NFP integrated circuit of FIG. 1.

FIG. 9 is a diagram of I-MU half island 205 and SRAM block 215. I-MU half island 205 includes several hardware engines 255-259. In the operational example, fast-path packet payload portions are DMA transferred directly from ingress NBI island 209 and across the configurable mesh data bus, through data bus interface 260 of I-MU half island 205, and into the data cache SRAM 261 of block 215. The ingress NBI DMA engine 230 issues a bulk write command across the configurable mesh data bus to the bulk transfer engine 255. The destination is the I-MU half island 205. The action is bulk write. The address where the data is to be written into the I-MU half island is the address taken out of the appropriate buffer list. The bulk write command received at the MU is a bulk write, so the data bus interface 260 presents the command to the bulk engine 255. The bulk engine 255 examines the command which is a write. In order to perform a write, the bulk engine needs data. The bulk engine therefore issues a pull-id through the pull portion of interface 260, which in turn issues a pull-id back onto the configurable mesh CPP data bus. The DMA engine 230 in NBI island 209 receives the pull-id. Part of the pull-id is a data reference which indicates to the DMA engine which part of the packet is being requested as data. The DMA engine 230 uses the data reference to read the requested part of the packet, and presents that across the data part of the CPP data bus back to bulk engine 255 in I-MU island 205. The bulk engine 255 then has the write command and the packet data. The bulk engine 255 ties the two together, and it then writes the packet data into SRAM 261 at the address given in the write command. In this way, fast-path packet payload portions pass from DMA engine 230 in the ingress NBI island 209, across the configurable mesh CPP data bus, through the data bus interface 260 of the I-MU half island 205, through a bulk transfer engine 255, and into data cache SRAM 261 of block 215. In a similar fashion, exception packet payload portions pass from the DMA engine 230 in ingress NBI island 209, across the configurable mesh CPP data bus, through the E-MU data bus interface of half island 206, through the bulk transfer engine of half island 206, through IP block 216, and through DDR PHYs 166 and 167, and into external memories 185 and 186. The packets are therefore said to be "split", with the header portions being stored in a CTM in an ME island (each header portion is stored as part of the "first part" of the packet information of the packet), and with the payload portions (each payload portion is also referred to as the "second part" of the packet information of the packet) of fast-path packets being stored in internal SRAM block 215, and with the payload portions of slow path packets (exception packets) being stored in external DRAM 185 and 186.

Figure 10:
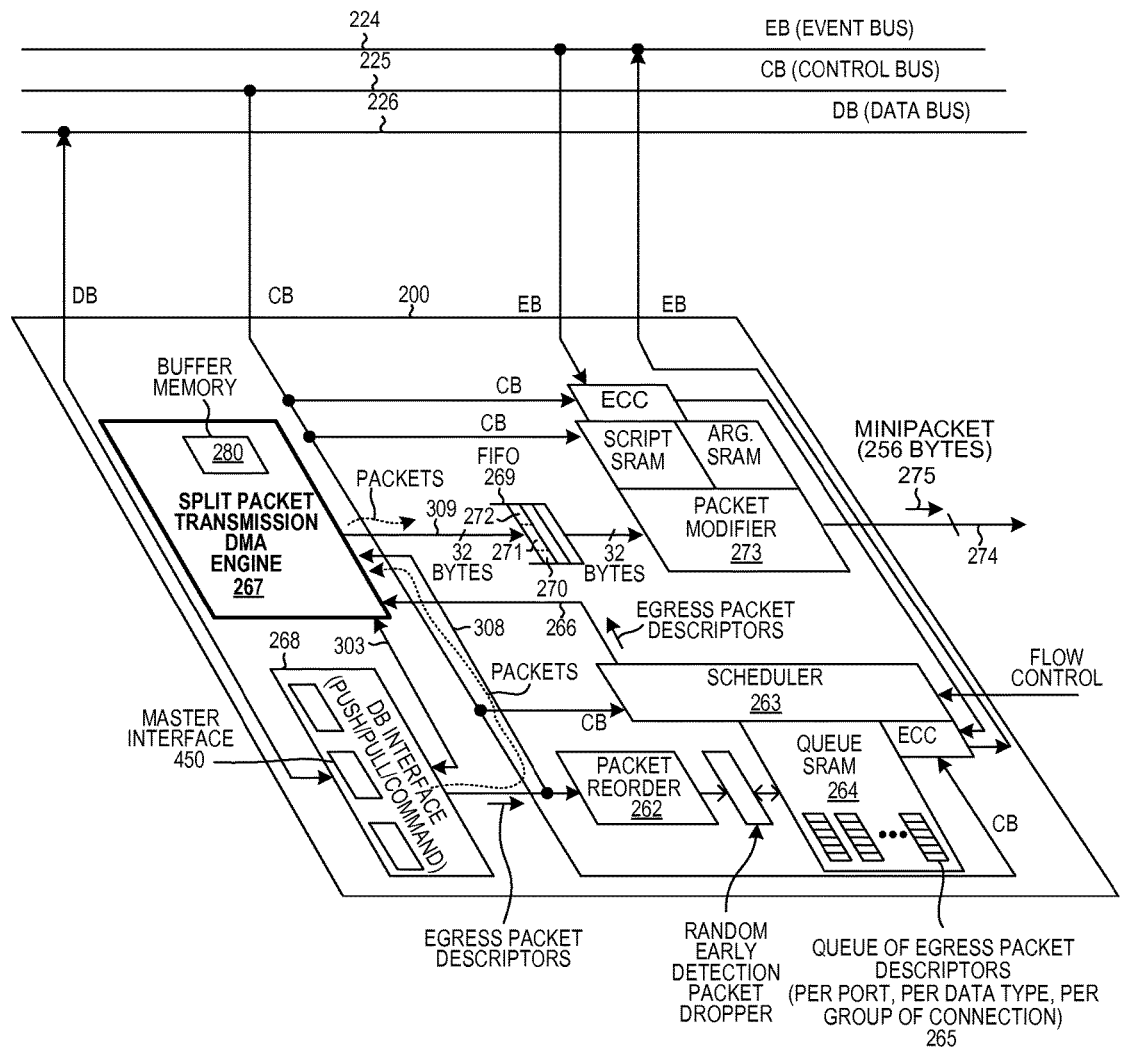
FIG. 10 is a diagram of an egress NBI island in the IB-NFP integrated circuit of FIG. 1.

FIG. 10 is a diagram of egress NBI island 200. In the operational example, an ME in the ME island 203 causes the egress NBI island 200 to be instructed to output a packet by causing the CTM 234 in the ME island 203 to issue a "packet ready" command to the egress NBI island, where the "packet ready" command in turn causes an egress packet descriptor to be supplied to the novel split packet transmission DMA engine 267. The "packet ready" command includes the PPI of the packet to be output. The "packet ready" command is a command to merge the parts of the packet, and to supply the merged packet to the input FIFO 269 of the packet modifier 273. The egress packet descriptor is communicated across the configurable mesh CPP data bus and to the packet reorder block 262. In this way, multiple egress packet descriptors enter packet reorder block 262. These egress packet descriptors are reordered so that the descriptors for the packets of a flow are in proper sequence. The scheduler 263 receives the properly ordered egress packet descriptors and pushes them onto appropriate queues in queue SRAM 264. Each such queue of egress packet descriptors is per port, per data type, per group of connections. Reference numeral 265 identifies one such queue. Packets of a connection in this case share the same set of source and destination IP addresses and TCP ports. Scheduler 263 schedules packets to be transmitted by popping egress packet descriptors off the queues in appropriate orders and at appropriate times, and by supplying the popped egress packet descriptors via conductors 266 to the novel DMA engine 267. The novel DMA engine 267 is also referred to here as the "Split Packet Transmission DMA engine".

As described in further detail below, this DMA engine 267 receives such an egress packet descriptor, and based on the information in the egress packet descriptor, operates with master interface 450 to transfer a part of the "first part" of the packet information and the "second part" of the packet information across CPP data bus and DB interface 268 and into the buffer memory 280 in the DMA engine 267. Once the script code and the complete packet is in the buffer memory 280, then the script code and the packet is moved 32-byte piece at a time, buffer by buffer, into FIFO 269. As a result, each entry in FIFO 269 includes a script code portion 270, the header portion 271 of the packet, and the payload portion 272 of the packet.

Information passes out of FIFO 269 and into the packet modifier 273 in ordered 32-byte chunks. The script code 270 at the beginning of the packet (as the packet and script code are stored in the FIFO 269) was added by the microengine in the ME island. As a result of the lookup performed at the direction of the microengine, a packet policy was determined, and part of this packet policy is an indication of what of the packet header to change and how to change it before the packet is transmitted. The packet modifier 273 receives a packet in 32-byte chunks from FIFO 269. As each 32-byte chunk passes through the packet modifier 273, it can increase in size due to the insertion of bits, or it can decrease in size due to the deleting of bits. The chunks pass through the pipeline in sequence, one after the other. The resulting modified chunks as they come out of the pipeline are aggregated at the end of the packet modifier 273 into larger 256-byte portions of a packet, referred to here as minipackets. A minipacket includes a number of chunks, along with associated out-of-band control information. The out-of-band control information indicates how the data of the minipacket can be assembled with the data of other minipackets to reform the overall modified packet. In this way, the resulting modified packet is output from the egress NBI island 200 as a sequence of 256-byte minipackets across dedicated connections 274 to egress MAC island 207. Reference numeral 275 identifies one such minipacket. For additional detailed information on the structure and operation of the egress NBI island 200, see: U.S. patent application Ser. No. 13/941,494, entitled "Script-Controlled Egress Packet Modifier", filed on Jul. 14, 2013, now U.S. Pat. No. 9,124,644, by Chirag P. Patel et al. (all the subject matter of which is hereby incorporated by reference).

Figure 11:
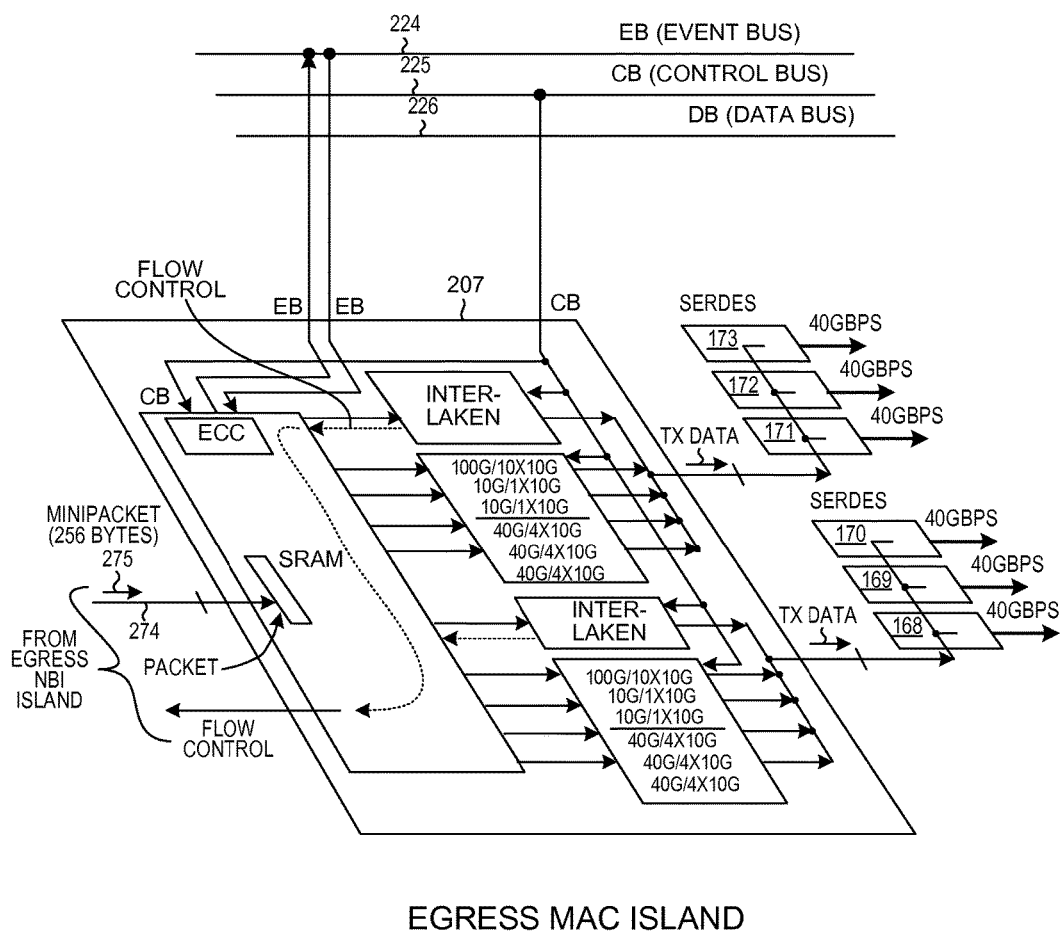
FIG. 11 is a diagram of an egress MAC island in the IB-NFP integrated circuit of FIG. 1.

FIG. 11 is a diagram of egress MAC island 207. In the presently described example, the packet traffic discussed in connection with FIG. 1 flows out of the egress MAC island 207 and through three SerDes I/O circuits 171-173 and out of the IB-NFP integrated circuit 150.

Figure 12:
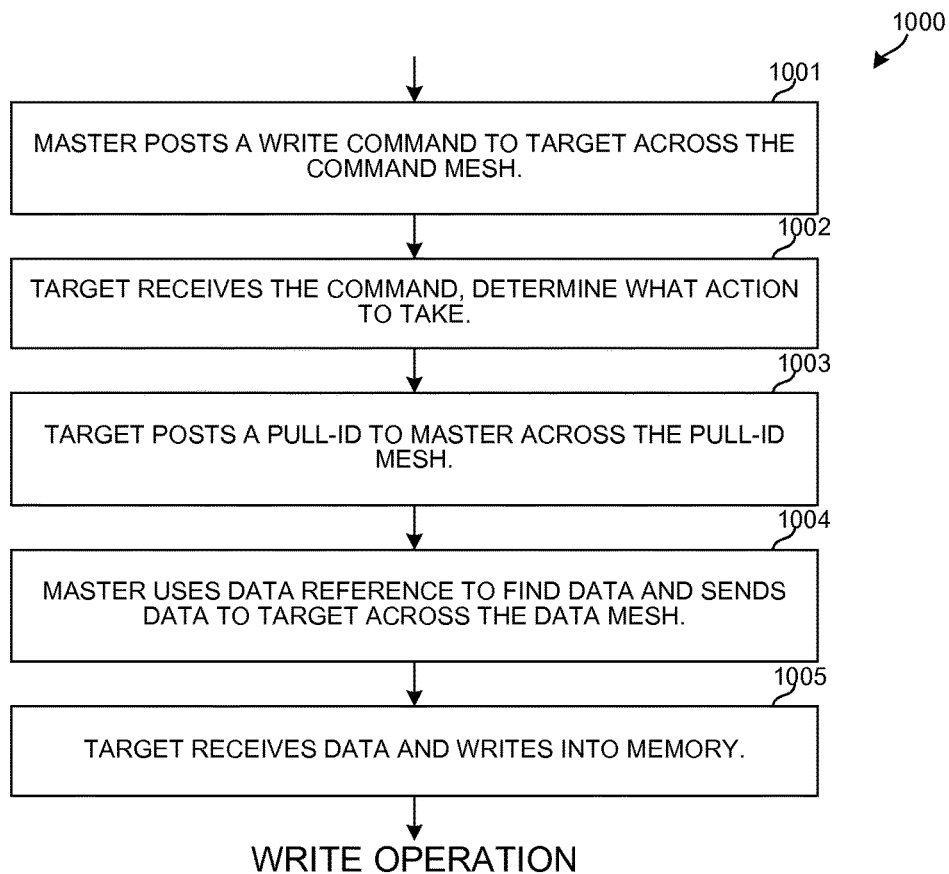
FIG. 12 is a flowchart that illustrates steps involved in a CPP write operation.

CCP Data Bus Operation: Operation of the Command/Push/Pull data bus is described below in connection with FIGS. 12-19. The CPP data bus includes four "meshes": a command mesh, a pull-id mesh, and two data meshes data0 and data1. FIG. 12 is a flowchart of a write operation method 1000 that might occur across the configurable mesh CPP data bus. In a first step (step 1001), certain functional circuitry in one of the islands uses its data bus interface to output a bus transaction value onto the configurable mesh CPP data bus. This functional circuitry is referred to as the "master" of the write operation. The format of the bus transaction value is as set forth in FIG. 13. A bus transaction value 1006 includes a metadata portion 1007 and a payload portion 1008 as shown. The metadata portion 1007 includes a final destination value 1009 and a valid bit 1010.

The bus transaction value in this case is a write command to write data into functional circuitry in another island. The functional circuitry that receives the bus transaction value and the data to be written is referred to as the "target" of the write operation. The write command is said to be "posted" by the master circuit onto the command mesh. As indicated in FIG. 13, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master circuit to the appropriate target circuit. All bus transaction values on the data bus that originate from the same island that have the same final destination value will traverse through the configurable mesh data bus along the same one path all the way to the indicated final destination island.

A final destination island may have more than one potential target circuit. The 4-bit target field of payload portion indicates which one of these targets in the destination island it is that is the target of the command. The 5-bit action field of the payload portion indicates that the command is a write. The 14-bit data reference field is a reference usable by the master circuit to determine where in the master the data is to be found. The address field indicates an address in the target where the data is to be written. The length field indicates the amount of data.

In a next step (step 1002) in the method 1000 of FIG. 12, the target circuit receives the write command from the command mesh and examines the payload portion of the write command. From the action field the target circuit determines that it is to perform a write action. To carry out this action, the target circuit writes (i.e., posts) a bus transaction value (step 1003) called a pull-id onto the pull-id mesh. The pull-id is also of the format indicated in FIG. 13. The payload portion of the pull-id is of the format set forth in FIG. 15. The final destination field of the metadata portion of the pull-id indicates the island where the master circuit is located. The target port field identifies which sub-circuit target it is within the target's island that is the target circuit of the command. The pull-id is communicated through the pull-id mesh back to the master circuit.

The master circuit receives the pull-id from the pull-id mesh and uses the content of the data reference field of the pull-id to find the data. In the overall write operation, the master circuit knows the data it is trying to write into the target circuit. The data reference value that is returned with the pull-id is used by the master circuit as a flag to match the returning pull-id with the write operation the master circuit had previously initiated.

The master circuit responds by sending (step 1004) the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 13. The format of the payload portion in the case of the payload being pull data is as set forth in FIG. 17. The first bit of the payload portion is asserted. This bit being a digital high indicates that the transaction is a data pull as opposed to a data push. The target circuit then receives (step 1005) the data pull bus transaction value across the data1 or data0 mesh. The target circuit writes the content of the data field (the data field of FIG. 17) of the pull data payload portion into target memory at the appropriate location indicated by the address field of the original write command.

Figure 19:
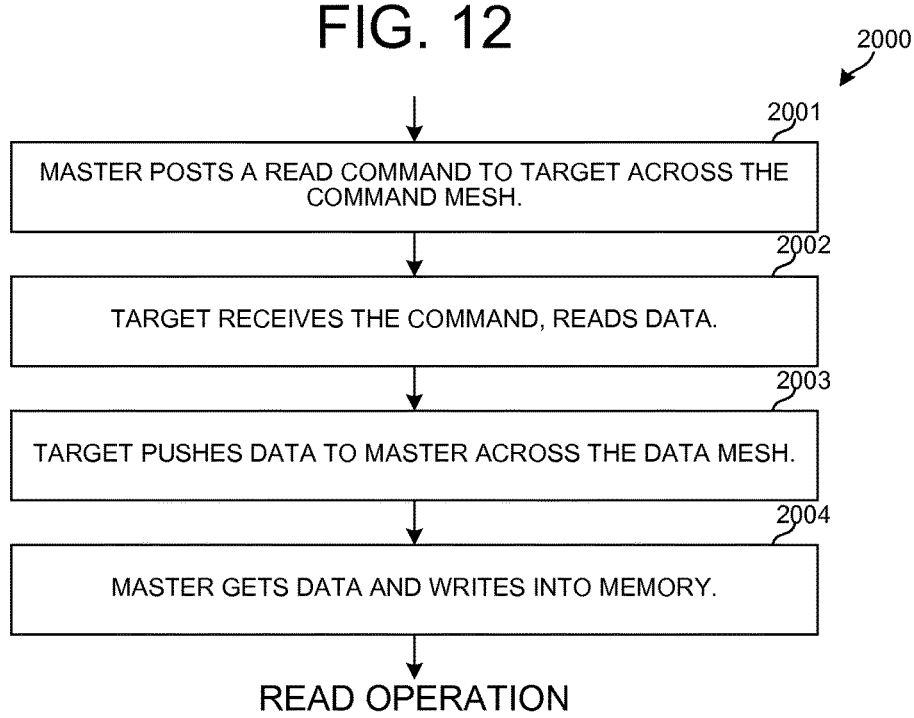
FIG. 19 is a flowchart that illustrates steps involves in a CPP read operation.

FIG. 19 is a flowchart of a read operation method 2000 that might occur across the configurable mesh CPP data bus. In a first step (step 2001), a master circuit in one of the islands uses its data bus interface to output (to "post") a bus transaction value onto the command mesh bus of the configurable mesh CPP data bus. In this case, the bus transaction value is a read command to read data from a target circuit. The format of the read command is as set forth in FIGS. 20 and 21. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data.

The target receives the read command (step 2002) and examines the payload portion of the command. From the action field of the command payload portion the target circuit determines that it is to perform a read action. To carry out this action, the target circuit uses the address field and the length field to obtain the data requested. The target then pushes (step 2003) the obtained data back to the master circuit across data mesh data1 or data0. To push the data, the target circuit outputs a push bus transaction value onto the data1 or data0 mesh. FIG. 18 sets forth the format of the payload portion of this push bus transaction value. The first bit of the payload portion indicates that the bus transaction value is for a data push, as opposed to a data pull. The master circuit receives the bus transaction value of the data push (step 2004) from the data mesh bus. The master circuit then uses the data reference field of the push bus transaction value to associate the incoming data with the original read command, and from the original read command determines where the pushed data (data in the date field of the push bus transaction value) should be written into the master circuit. The master circuit then writes the content of the data field of the data field into the master's memory at the appropriate location.

Figure 20A:
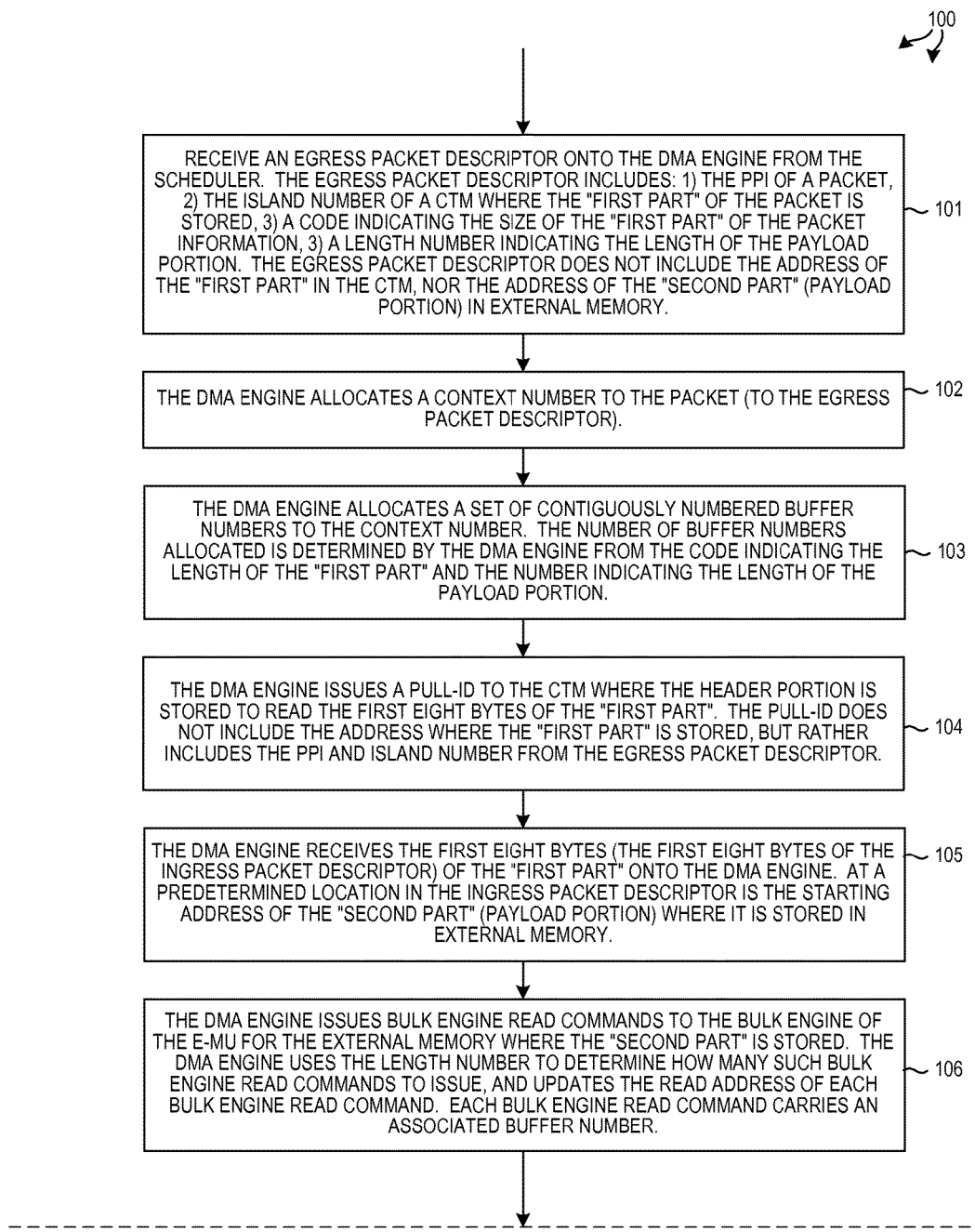
FIG. 20A is a first part of a larger FIG. 20.
Figure 20B:
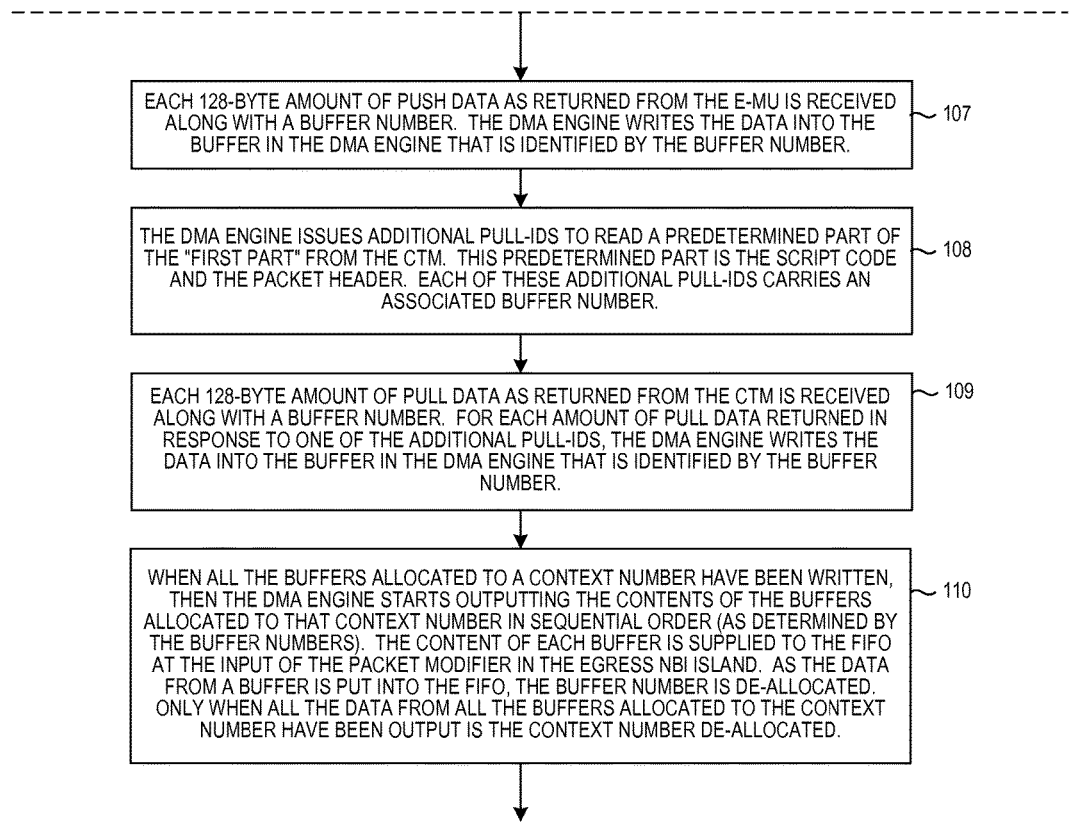
FIG. 20B is a second part of the larger FIG. 20.

Split Packet Transmission Data Engine Operation: FIG. 20A and FIG. 20B together make up a larger FIG. 20. FIG. 20 is a flowchart of a method 100 of operation of the split packet transmission DMA engine 267. The term "DMA" is used here, and in this patent document, in a colloquial broad and general sense to mean a specialized data mover device that can be instructed by another device (for example, a processor) to perform data moving tasks.

In a first step (step 101), the novel DMA engine 267 receives an egress packet descriptor from the scheduler 263. As described above, this egress packet descriptor is supplied to the DMA engine 267 as a result of a "packet ready" CPP bus command sent from the CTM 234 in the ME island 203 to the DMA engine 267 in the egress NBI island 200. The egress packet descriptor includes, among other parts not set forth here: 1) a packet portion identifier (PPI) that identifies a packet, 2) the island number that identifies the CTM where the header portion (as part of the "first part" of the packet information) is stored, 3) a number indicating how long the entire packet is, 4) a script code offset value (indicating the offset between the beginning of the "first part" and the beginning of the packet modifier script code), 5) a two-bit code indicating how big the "first part" is (either 256B, or 512B, or 1 KB or 2 KB), 6) a number indicating the length of the payload portion of the packet, 7) a sequence number of the packet in the flow, 8) an indication of which queue the packet belongs to (result of the packet policy), 9) an indication of where the packet is to be sent (a result of the packet policy), 10) user metadata indicating what kind of packet it is.

As described in further detail in U.S. patent application Ser. No. 14/464,692, entitled "PPI Allocation Request And Response For Accessing A Memory System", filed Aug. 20, 2014, now U.S. Pat. No. 9,559,988, by Salma Mirza et al. (the entire contents of which is incorporated herein by reference), the CTM 234 includes a packet engine. The packet engine stores each header portion in the CTM in association with a PPI. As mentioned above, the header portion is stored as part of the "first part" of the packet information of the packet. The PPI is a nine-bit number that the packet engine allocates for use in identifying the packet. Once the packet engine is no longer storing and handling the header portion for a given packet, then the PPI number is de-allocated, and can then be allocated for use with another packet. The PPI mentioned above as being contained in the egress packet descriptor is one such PPI that the packet engine in the CTM has allocated to, and associated with, the header portion of the packet as it is stored in the CTM.

Next, the DMA engine allocates (step 102) a 6-bit context number to the packet (to the egress packet descriptor), to allocate one of sixty-four contexts. This allocation is similar to the allocation of PPIs as performed by the packet engine, except in this case the DMA engine 267 is allocating a context number to the packet associated with the egress packet descriptor. In addition, the DMA engine allocates (step 103) a set of contiguously numbered buffer numbers to the context number. Within the DMA engine 267 there is a 16K byte buffer memory 280 as mentioned above. This buffer memory 280 is made up of 128 buffers, where each buffer is 128 bytes long. Each such 128-byte buffer has an associated number. The numbers of the buffers are sequential numbers, and the buffers as located in the buffer memory are adjacent each other in the same order. The buffers denoted buffer#1, buffer#2, buffer#3 are physically located in the buffer memory adjacent one another in the order of: the buffer identified by number buffer#1, the buffer identified by the buffer number buffer#2, the buffer identified by the buffer number buffer#3, and so forth. The number of buffers allocated to a context number is determined by the DMA engine from the 2-bit code in the egress packet descriptor that indicates the length of the "first part" and from the number that indicates the length of the payload portion. Only sequentially numbered buffers are allocated.

Next (step 104), the DMA engine 267 responds to the "packet ready" CPP command by issuing an initial pull-id to the CTM 234 where the first part of the packet information is stored. This pull-id is to read the first eight bytes of the ingress packet descriptor from the beginning of the "first part" of the packet information in the CTM. The pull-id includes the PPI and an offset value, where the offset value is zero because the very first eight bytes of the "first part" is to be read. The pull-id does not include an actual address where the "first part" is stored, but rather the pull-id includes the PPI (as obtained from the egress packet descriptor) and the island number of the CTM (as obtained from the egress packet descriptor). The pull-id is communicated across the pull-id mesh to the CTM 234. The CTM 234 receives the pull-id, and the packet engine within the CTM 234 uses the PPI to perform a PPI-to-address translation to obtain an address in the memory of the CTM where the header portion is stored. The CTM 234 the uses this address to read the first eight bytes of the "first part" out of the CTM's memory, and then returns those first eight bytes back to the DMA engine 267 across the data mesh of the CPP bus. The DMA engine 267 receives (step 105) the first eight bytes of the "first part", which is the first eight bytes of the ingress packet descriptor as placed there by an microengine (ME). These first eight bytes are not loaded into buffer memory 280 in the DMA engine, but rather are stored elsewhere. At a predetermined location in these first eight bytes is: 1) the starting address of the "second part" of the packet information (the payload portion) where it is stored in external DRAM memory, and 2) the island number of the memory control unit that interfaces with the external DRAM memory.

The DMA engine extracts this starting address and island number information, and uses that information to issue (step 106) bulk engine read CPP commands to the bulk engine in the E-MU control island 206 for the external memory 185 and 186 where the payload portion (the "second part" of the packet information) is stored. The DMA engine determines from the length information in the egress packet descriptor how many such bulk engine read commands to issue, and it also handles updating the address of each successive bulk engine read command so that 128-byte portion, by 128-byte portion, is read out of the external memory by the bulk engine and is sent by the bulk engine back to the DMA engine. Each bulk engine read command includes a context number and an associated buffer number. The context number and buffer number are returned with the push data. A buffer number indicates to the DMA engine where the push data returned by the bulk engine is to be stored in the DMA engine's buffer memory 280.

Each 128-byte amount of push data as returned from the external memory is received (step 107) along with the context number and a buffer number. The DMA engine 267 uses the buffer number to write the data into the indicated buffer in the buffer memory.

The DMA engine also issues additional pull-ids (in response to the initial "packet ready" command) on the pull-id mesh of the CPP data bus. Each of these pull-ids is to have the CTM 234 return the next 128-byte piece of a part of the "first part" to the DMA engine 267, where the 128-byte piece of data will be received onto the DMA engine 267 via the data mesh of the CPP data bus. Each of these pull-ids includes the same PPI number, and an offset. The offset indicates which particular piece of the "first part", as identified by the PPI, is to be returned. The DMA engine handles incrementing the offset values of the pull-ids as the pull-ids are output from the DMA engine. The very last pull-id (to read the very last piece of the "first part") contains a field indicating that the pull-id is the last pull-id for the "packet ready" command. These additional pull-ids have offsets such that the part of the "first part" is transferred from the CTM 234 to the DMA engine 267. The part of the "first part" may, for example, be the script code and the packet header portion. Bytes of the "first part" that precede the script code are not transferred as a result of these additional pull-ids.

Each 128-byte amount of the pull data as returned from the CTM 234 due to one of these additional pull-ids is received (step 109) onto the DMA engine along with a buffer number. The data is received via the data mesh of the CPP bus. The DMA engine 267 uses the buffer number to write the data into the appropriate buffer in the buffer memory 280 in the DMA engine 267. In this way the script code and the packet header portion (from the "first part") are transferred from the CTM 234 and into the buffer memory 280. Bytes of the "first part" that precede the script code are not written into the buffer memory 280.

Although the data transfers (due to bulk engine read commands) from the external memory into the DMA engine are shown in FIG. 20 before the data transfers (due to pull-ids from the DMA engine) from the CTM into the DMA engine, the transfers from the external memory and from the CTM can happen in any order, and can happen in interleaved fashion. The bus latencies of these various transfers into the DMA engine may be different and may be unpredictable. The DMA engine handles receiving the various pieces of the part of the "first part" and the "second part", and handles loading them into the buffer memory 280 at the correct places so that they are stored in order in the buffer memory 280, regardless of what order the various pieces were received onto the DMA engine.

The DMA engine detects when all the buffers allocated to the context number of the packet have been filled with data. The DMA engine then starts outputting (step 110) the contents of the buffers in sequential order (according to buffer number) for that context number. The content of each buffer is supplied to the FIFO 269 at the input of the packet modifier 273 in the egress NBI island 200 of FIG. 10. The content of each 128-byte buffer is supplied to FIFO 269 thirty-two bytes at a time. The contents of the buffers are supplied, buffer by buffer, until the entire packet is in FIFO 269. In the illustrated example, each FIFO entry is 128-bytes, and the FIFO data is supplied to the packet modifier 273 in ordered 32-byte chunks. Accordingly, the packet modifier 273 receives a script code and its complete packet from FIFO 269, and then a next script code and its complete packet, and so forth. Packets are not supplied to the packet modifier 273 in fragmented form with a piece of a first packet being supplied, and then a piece of a second packet being supplied, and then the remainder of the first packet being supplied. Entire packets are supplied to the packet modifier 273, one by one. As the data from a buffer of buffer memory 280 is put into the FIFO 269, the DMA engine 267 de-allocates the buffer number of that buffer. Only when the data from all the buffers allocated to the context number have been output to the FIFO 269 does the DMA engine 267 de-allocate the context number.

Figure 21:
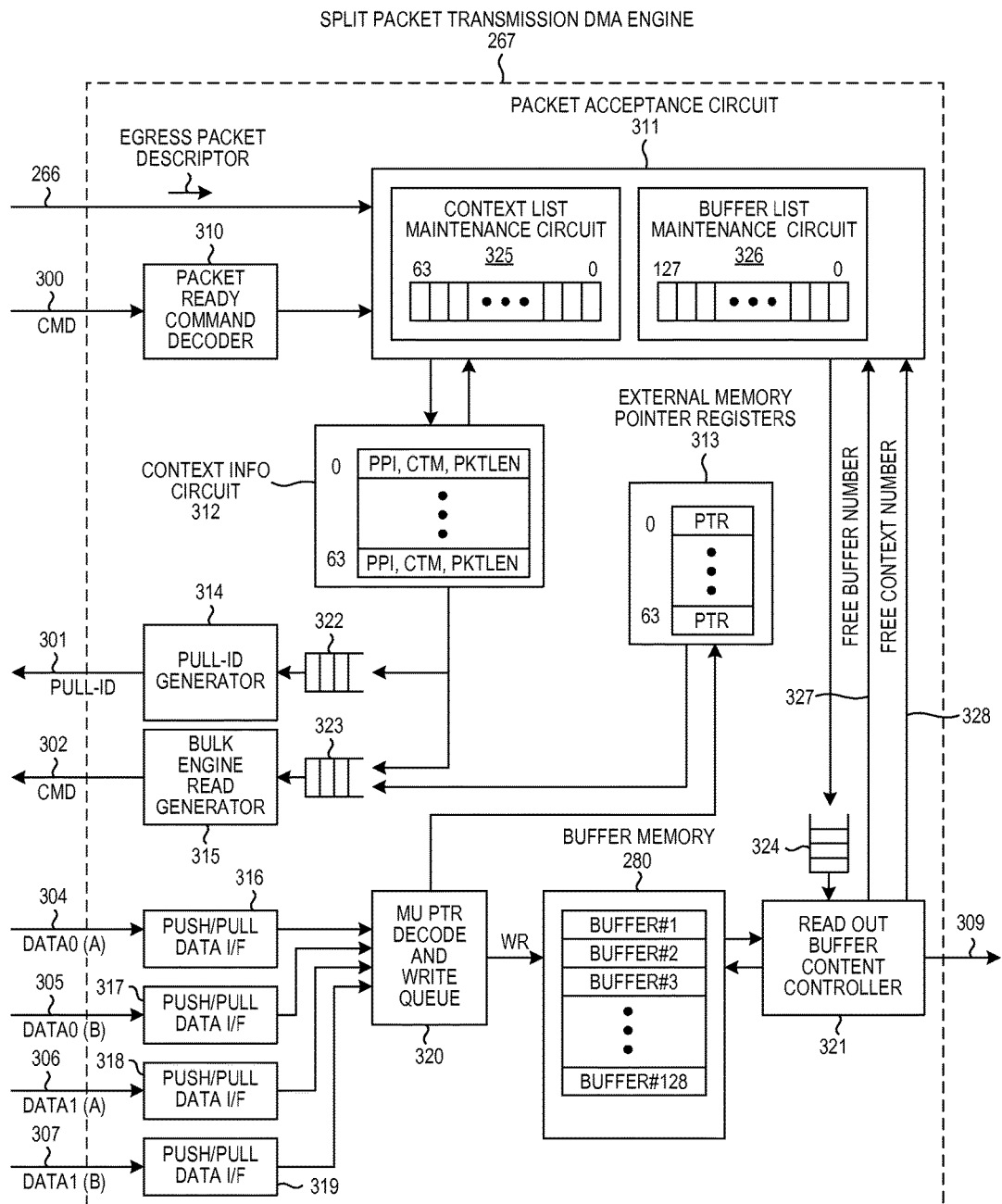
FIG. 21 is a block diagram of the split packet transmission DMA engine 267 of FIG. 10.

FIG. 21 is a block diagram of the split packet transmission DMA engine 267 of FIG. 10. The lines 300-302 of FIG. 21 correspond to the bidirectional line 303 in FIG. 10. CPP commands (such as a "packet ready" command) are received from the DB interface 268 via lines 300. The DMA engine 267 outputs pull-ids to the DB interface 268 via lines 301. The DMA engine 267 outputs bulk engine read commands to the DB interface 268 via lines 302. Line 303 in FIG. 10 is therefore illustrated as bidirectional. The DMA engine 267 receives data, such as the "first part" of the packet information and such as the "second part" of the packet information, from the DB interface 268 via lines 304-307 of FIG. 21. Lines 304-307 of FIG. 21 correspond to the line 308 in FIG. 10. DMA engine 267 outputs data (a script code followed by an assembled packet) via lines 309 of FIG. 21. Lines 309 of FIG. 21 are also shown in FIG. 10 extending to the FIFO 269.

DMA engine 267 includes a packet ready command decoder 310, a packet acceptance circuit 311, a context information maintenance circuit 312, an external memory pointer registers maintenance circuit 313, a pull-id generator circuit 314, a bulk engine read command generator circuit 315, four push/pull data interface circuits 316-319, a memory address pointer decode and write queue circuit 320, the buffer memory 280, a read out buffer content controller 321, and FIFOs 322-324. The packet acceptance circuit 311 includes a context list maintenance circuit 325 and a buffer list maintenance circuit 326. The context list maintenance circuit 325 records whether each of the sixty-four context numbers has been allocated or not, and if it has been allocated then the circuit also records the PPI to which it has been allocated. The circuit 325 also handles allocating context numbers and de-allocating context numbers. The DMA engine 267 can be processing up to sixty-four packets at any given time, where each packet that is being processed is allocated one of the sixty-four context numbers. The buffer list maintenance circuit 326 records whether each of the 128 buffers (in buffer memory 280) has been allocated or not, and if it has been allocated then the circuit also records the context number to which it has been allocated. When an egress packet descriptor is first received via lines 266 onto the DMA engine 267, the unallocated context numbers as recorded in circuit 325 are examined and the one of those unallocated context numbers whose context number is the lowest is allocated to the PPI of the packet egress packet descriptor.

Also, a set of buffer numbers is allocated to the context number. Length information in the egress packet descriptor (the two-bit value indicating the size of the "first part" and the value indicating the length of the payload portion of the packet) are used by circuit 326 to determine the number of buffers needed to store the packet, and the circuit 326 checks all unallocated buffer numbers and picks the set of contiguously numbered unallocated buffer numbers that together are large enough to store the packet. These buffer numbers are then recorded in circuit 326 as being allocated to the context number. The circuit 326 in this way handles allocating buffer numbers.

The context information maintenance circuit 312 maintains information for each of the sixty-four contexts, including the PPI associated with the packet that is being assembled in the context, the CTM number where the header portion is stored, and a value indicating the total length of the packet. Once the egress packet descriptor has been received and a context number has been allocated and a set of buffers has been allocated, then the circuit 312 causes the pull-id generator circuit 314 to issue a first pull-id (in response to the "packet ready" command) to read the first eight bytes of the "first part". This first pull-id is a short and preferably fast pull-id as compared to later-issued pull-ids. When the first eight bytes of the very beginning of the "first part" is returned to the DMA engine 267 via the data mesh of the CPP bus, the information passes through the push/pull data interface circuits 316-319 to the circuit 320. The circuit 320 extracts the address information indicating where the second part is stored. This address information includes an island number (of the control block for the memory) and a memory address. For each of the sixty-four contexts being handled, the external memory pointer registers circuit 313 maintains the last address in external address for which the DMA engine has issued a bulk engine read command. Accordingly, in response to receiving the first eight bytes of the "first part", the initial address information is therefore written into circuit 313 for the context of the egress packet descriptor. The returned eight bytes of data for this first pull-id is not written into buffer memory 280. The circuit 312 uses the address information to cause the bulk engine read generator circuit 315 to issue a first bulk engine read command onto the CPP data bus to read the first piece of "second part". Each such bulk engine read command includes the context number and the buffer number of a buffer into which the return data shall be stored. When the data is returned via the push-pull data interface circuits 316-319, the circuit 320 extracts the context number and buffer number from the beginning of the data, and writes the remainder of the data into the appropriate buffer in the buffer memory 280. The external memory pointer registers circuit 313 causes multiple such bulk engine read commands to be issued via the bulk engine read generator circuit 315 and FIFO 323, and as each successive bulk engine read command is output the address (pointer) to read is incremented under the control of the external memory pointer registers circuit 313.

Likewise, the context information circuit 312 causes the pull-id generator circuit 314 to issue additional pull-ids onto the pull-id mesh of the CPP data bus (in response to the "packet ready" command), with each successive pull-id having the same PPI number, but with each successive pull-id having a different offset value. The offset values of these pull-ids are incremented under the control the context information circuit 312 so that each pull-id results in a different piece of the "first part" being returned to the DMA engine. Enough pull-ids are generated in this way so as to read the part of the "first part" from the CTM into the DMA engine. This part of the first part starts at the script code and includes the script code and the packet header. The external memory pointer registers circuit 313 causes the last of these pull-ids to include a field that indicates that it is the last pull-id for the associated "packet ready" command. Each corresponding amount of data as returned (in response to one of these pull-ids) has a context number and a buffer number, and the circuit 320 extracts these values from the incoming data and uses them to write the remainder of the data into the appropriate buffer in buffer memory 280. In this way using these additional pull-ids, the script code and the packet header are loaded into buffer memory 280. Bytes of the "first part" before the script code are not loaded into the buffer memory 280.

When all the allocated buffers for the context have been filled, then the read out buffer content controller 321 reads the contents of the allocated buffer (allocated to that context number) with the smallest buffer number and supplies the data to the FIFO 269 via lines 309. When all the data of a buffer has been read out of the buffer memory, then the read out buffer content controller 321 alerts the packet acceptance circuit 311 of the buffer number via lines 327. The packet acceptance circuit 311 responds by de-allocating ("freeing") that buffer number. The contents of buffers are read out of the buffer memory, buffer by buffer, in order of buffer number. When all the buffer numbers allocated to the context have been read and their data supplied via lines 309 to FIFO 269, then the read out buffer content controller 321 alerts the packet acceptance circuit 311 of the context number via lines 328. The packet acceptance circuit 311 responds by de-allocating ("freeing") that context number.

Although the split packet transmission DMA engine 267 is described above as performing merging operations for one CTM, in a typical usage in the IB-NFP a single split packet transmission DMA engine merges packet information for multiple different CTMs. Multiple different CTMs can cause egress packet descriptors to be supplied to the same split packet transmission DMA engine.

In one example, the split packet transmission DMA engine 267 is implemented by describing the function of each block of FIG. 21 in a hardware description language (such as Verilog, or VHDL, or CDL) and then using a commercially available hardware synthesis program (such as Design Compiler by Synopsis) to realize a hardware circuit from the functional description. In a preferred embodiment, the DMA engine 267 is implemented as shown in FIG. 10 without any processor that fetches and decodes and executes any processor-executable instructions.

Although certain specific embodiments are described above for instructional purposes, the teachings of this patent document have general applicability and are not limited to the specific embodiments described above. In some examples, the DMA engine is configurable so that the specific amount of the "first part" that is transferred into the buffer memory is configurable. All of the "first part" is transferred into the buffer memory in some configurations, whereas only a part of the "first part" is transferred into buffer memory in other configurations. In some examples, all of the "first part" and all of the "second part" are stored in the buffer memory, but only a configurable amount of these is read out of the buffer memory and is supplied to the egress device. Accordingly, various modifications, adaptations, and combinations of various features of the described embodiments can be practiced without departing from the scope of the invention as set forth in the claims.

What is claimed is:

1. A system comprising:
a bus;
a first device that is operatively coupled to the bus, wherein the first device includes a memory that stores a first part of packet information, wherein the first part of packet information includes a first descriptor, and wherein the first device can translate a PPI (Packet Portion Identifier) into address information;
a second device that is operatively coupled to the bus, wherein the second device stores a second part of the packet information; and
a third device that is operatively coupled to the bus, wherein the third device comprises:
an egress FIFO (First In First Out) memory; and
means that comprises a buffer memory, wherein the means is for: 1) receiving a second descriptor, wherein the second descriptor includes a PPI and length information, wherein the PPI is not an address and also includes no address; 2) sending the PPI to the first device across the bus such that the first device translates the PPI into first address information and then uses the first address information to read part of the first descriptor from the memory of the first device, 3) receiving the part of the first descriptor from the first device via the bus, 4) extracting second address information from the first descriptor, 5) causing a part of the first part of the packet information to be transferred from the first device to the means across the bus and to be stored into the buffer memory, 6) using the second address information and the length information to cause the second part of the packet information to be transferred from the second device to the means across the bus and to be stored into the buffer memory, wherein the second part of the packet information is transferred in a plurality of bus transfers, and wherein after the transferring of the first part and after the transferring of the second part the first and second parts are stored together in the buffer memory, 7) once the part of the first part and the second part of the packet information have been stored in the buffer memory then transferring the packet information from the buffer memory to the egress FIFO memory, wherein the means comprises no processor that fetches and executes instructions.

2. The system of claim 1, wherein the first device, the bus, and the second device are parts of an integrated circuit, and wherein the second part of the packet is stored external to the integrated circuit.

3. The system of claim 1, wherein the part of the first part includes a script code and a packet header but does not include the first descriptor, and wherein the first descriptor is not stored in the buffer memory.

4. The system of claim 1, wherein after the transferring of the part of the first part and after the transferring of the second part the part of the first part and the second part are stored together in the buffer memory in a single block of contiguous memory locations.

5. The system of claim 1, wherein the buffer memory comprises a plurality of buffers, and wherein the means is also for: 8) using the length information to allocate a plurality of buffers, wherein all the buffers of the plurality are allocated at the same time, and 9) de-allocating buffers one by one, wherein a buffer is de-allocated by the means upon packet information being transferred from the buffer to the egress FIFO memory.

6. The system of claim 5, wherein the means is also for: 10) communicating an allocated buffer number across the bus from the third device to the first device such that the first device in return communicates back to the third device across the bus the allocated buffer number and an amount of the first part of packet information.

7. The system of claim 5, wherein the means is also for: 10) communicating an allocated buffer number across the bus from the third device to the second device such that the second device in return communicates back to the third device across the bus the allocated buffer number and an amount of the second part of packet information.

8. The system of claim 1, wherein the means is for causing parts of first parts and second parts of multiple different amounts of packet information to be transferred across the bus and to be stored into the buffer memory so that the multiple different amounts of packet information are being assembled in the buffer memory at the same time.

9. The system of claim 1, wherein a part of a first part of a second amount of packet information is stored in a fourth device, wherein a second part of the second amount of packet information is stored in the second device, and wherein the means of the third device is also for causing the part of the first part and the second part of the second amount of packet information to be transferred across the bus to the third device and to be assembled in the buffer memory.

10. The system of claim 1, wherein the bus is a Command/Push/Pull (CPP) bus, and wherein the CPP bus comprises a set of command conductors, a set of pull-id conductors, and a set of data conductors.

11. An integrated circuit that is operable with a second memory, wherein the second memory is external to the integrated circuit, wherein the second memory stores a second part of packet information, the integrated circuit comprising:
a bus;
a first memory that stores a first part of the packet information, wherein the first part includes a first descriptor, wherein the first descriptor includes address information; and
a split packet transmission DMA (Direct Memory Access) engine that is operatively coupled to the bus, wherein the DMA engine: 1) receives a second descriptor, wherein the second descriptor includes an identifier associated with the packet information, 2) uses the identifier to obtain a part of the first descriptor from the first memory, 3) extracts the address information from the part of the first descriptor, 4) causes a part of the first part of the packet information to be transferred from the first memory to the DMA engine across the bus and to be stored into a buffer memory in the DMA engine, 5) uses the address information to cause the second part of the packet information to be transferred from the second memory to the DMA engine across the bus and to be stored into the buffer memory, and wherein after the transferring of the part of the first part and after the transferring of the second part the part of the first part and the second part are stored together in the buffer memory, 6) once the part of the first part and the second part of the packet information have been stored in the buffer memory then transfers the packet information from the buffer memory to the egress FIFO memory, wherein the DMA engine comprises no processor that fetches and executes instructions.

12. The integrated circuit of claim 11, wherein the part of the first part includes a script code and a packet header but does not include the first descriptor.

13. The integrated circuit of claim 11, wherein the buffer memory comprises a plurality of buffers, and wherein the split packet transmission DMA engine further comprises:
a circuit that maintains a context allocation/de-allocation list; and
a circuit that maintains a buffer allocation/de-allocation list.

14. The integrated circuit of claim 13, wherein the bus is a Command/Push/Pull (CPP) bus, and wherein the split packet transmission DMA engine further comprises:
a CPP bus interface that is coupled to the bus.

15. The integrated circuit of claim 12, wherein the second descriptor does not comprise any address.

16. The integrated circuit of claim 12, wherein the identifier is a PPI (Packet Portion Identifier).

17. A method involving a bus, a first memory, a second memory and an egress device, wherein the first memory stores a first part of packet information, wherein the first part includes a first descriptor and packet header information, wherein the second memory stores a second part of the packet information, wherein the second part includes packet payload information, the method comprising:
(a) receiving a second descriptor onto a split packet transmission DMA (Direct Memory Access) engine, wherein the second descriptor contains no address indicating where the second part is stored in the second memory;
(b) extracting an identifier from the second descriptor;
(c) using the identifier to cause a part of the first part of the packet information to be transferred from the first memory across the bus and into a buffer memory in the DMA engine;
(d) using the first descriptor to cause the second part of the packet information to be transferred from the second memory across the bus and into the buffer memory in the DMA engine; and
(e) after the part of the first part and the second part have been transferred into the buffer memory then transferring the part of the first part and the second part out of the buffer memory and into the egress device, wherein the DMA engine includes no processor that fetches and executes processor-executable instructions, and wherein (a) through (e) are performed by the DMA engine.

18. The method of claim 17, wherein the identifier extracted in (b) is not an address, and wherein (c) involves causing the identifier to be translated into first address information, and causing the first address information to be used to read the part of the first part of the packet information out of the first memory and to be transferred to the DMA engine.

19. The method of claim 17, wherein the first descriptor includes second address information, and wherein (d) involves using the second address information to cause the second part to be read out of the second memory.

20. The method of claim 17, wherein the bus, the first memory, the egress device and the DMA engine are parts of an integrated circuit, and wherein the second memory is external to the integrated circuit.

21. The method of claim 17, wherein the first descriptor is not present in the DMA engine prior to the extracting of the identifier in (b).

22. The method of claim 17, wherein the part of the first part of packet information includes an amount of script code, the method further comprising:
(f) the egress device using the script code to determine how to modify at least some of the packet information that was transferred in (e) into the egress device;
(g) the egress device modifying at least some of the packet information thereby obtaining modified packet information; and
(h) transferring the modified packet information from the egress device to an egress MAC (Media Access Control) circuit.

23. A system comprising:
a bus;
a first device that is operatively coupled to the bus;
a second device that is operatively coupled to the bus; and a split packet transmission DMA (Direct Memory Access) engine that is operatively coupled to the bus, wherein the split packet transmission DMA engine comprises:
an egress FIFO (First In First Out) memory; and
means that comprises a buffer memory, wherein the means is for: 1) receiving an egress packet descriptor, wherein the egress packet descriptor includes a PPI (Packet Portion Identifier), wherein the PPI is not an address and also includes no address; 2) sending the PPI to the first device across the bus, wherein the means at the time it sends the PPI does not have an address indicating where a second part of a packet is stored in the second device; 3) receiving an amount of script code and a first part of the packet from the first device via the bus, wherein the first part of the packet comprises header information, 4) causing the second part of the packet to be transferred from the second device to the means across the bus in a plurality of bus transfers, wherein the second part of the packet comprises payload information, 5) storing the amount of script code, the first part of the packet and the second part of the packet together in the buffer memory, 6) transferring the amount of script code, the first part of the packet and the second part of the packet from the buffer memory to the egress FIFO memory, wherein the means comprises no processor that fetches and executes instructions.

24. The system of claim 23, wherein the means stores the first part of the packet and the second part of the packet together in contiguous memory locations in the buffer memory.

25. The system of claim 23, wherein the means of the split packet transmission DMA engine is also for: allocating a set of buffer numbers, wherein the means is also for communicating a buffer number to the second device for each of the plurality of bus transfers so that each of the plurality of bus transfers will communicate a corresponding part of the second part of the packet from the second device back to the means along with a buffer number for that corresponding part.

26. The system of claim 23, wherein the split packet transmission DMA engine further comprises:
a packet modifier, wherein the packet modifier receives the script code, the first part of the packet and the second part of the packet from the egress FIFO, wherein the packet modifier modifies at least some of the packet in accordance with the script code thereby generating modified packet information, wherein the modified packet information is passed from the split packet transmission DMA engine directly to an egress MAC (Media Access Control) circuit without being modified by any processor.

* * * * *